(12) United States Patent
Davis et al.

(10) Patent No.: US 11,954,840 B2
(45) Date of Patent: Apr. 9, 2024

(54) WELLHEAD ALIGNMENT SYSTEMS AND METHODS

(71) Applicant: Cameron International Corporation, Houston, TX (US)

(72) Inventors: Alan Davis, Houston, TX (US); Tianxiang Su, Arlington, MA (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 137 days.

(21) Appl. No.: 17/659,724

(22) Filed: Apr. 19, 2022

(65) Prior Publication Data

US 2023/0334643 A1    Oct. 19, 2023

(51) Int. Cl.
| | |
|---|---|
| *G06T 7/00* | (2017.01) |
| *E21B 33/035* | (2006.01) |
| *G06T 7/70* | (2017.01) |
| *G06T 11/00* | (2006.01) |
| *G06V 10/24* | (2022.01) |
| *H04N 7/18* | (2006.01) |

(52) U.S. Cl.
CPC .......... *G06T 7/0004* (2013.01); *E21B 33/035* (2013.01); *G06T 7/70* (2017.01); *G06T 11/00* (2013.01); *G06V 10/245* (2022.01); *H04N 7/183* (2013.01); *G06T 2200/24* (2013.01); *G06T 2207/30108* (2013.01); *G06T 2207/30204* (2013.01)

(58) Field of Classification Search
CPC ......... G06T 7/0004; G06T 7/70; G06T 11/00; G06T 2200/24; G06T 2207/30108; G06T 2207/30204; E21B 33/035; E21B 19/165; E21B 33/0355; G06V 10/245; H04N 7/183; H04N 7/18; H04N 7/185
USPC .......................................................... 348/81
See application file for complete search history.

(56) References Cited

U.S. PATENT DOCUMENTS

| | | | |
|---|---|---|---|
| 3,032,105 A | 5/1962 | Reistle, Jr. | |
| 3,199,613 A * | 8/1965 | Malott | E21B 41/0014 348/81 |
| 3,788,396 A * | 1/1974 | Shatto, Jr. | E21B 7/122 166/341 |
| 4,016,655 A | 4/1977 | Crow | |
| 4,031,544 A * | 6/1977 | Lapetina | B63C 11/48 166/341 |
| 4,214,842 A * | 7/1980 | Franks | E21B 43/017 166/341 |
| 4,862,426 A | 8/1989 | Cassity et al. | |
| 6,478,087 B2 | 11/2002 | Allen | |

(Continued)

FOREIGN PATENT DOCUMENTS

| | | |
|---|---|---|
| CN | 105507843 A | 4/2016 |
| WO | 2018140508 A1 | 8/2018 |

(Continued)

*Primary Examiner* — Albert H Cutler
(74) *Attorney, Agent, or Firm* — Jeffrey D. Frantz (57) ABSTRACT

A wellhead alignment system includes a visual marker configured to be placed at a wellhead and a camera configured to capture an image that includes the visual marker. The wellhead alignment system also includes one or more processors configured to apply computer vision algorithms to identify the visual marker in the image and to calculate an offset between the wellhead and a drilling rig based on a position of the visual marker in the image.

17 Claims, 8 Drawing Sheets

(56) References Cited

U.S. PATENT DOCUMENTS

| | | | |
|---|---|---|---|
| 8,191,915 B2* | 6/2012 | Freese, V | B60D 1/58 |
| | | | 340/686.2 |
| 9,163,471 B2 | 10/2015 | Coonrod et al. | |
| 10,138,699 B2 | 11/2018 | Nguyen | |
| 10,605,033 B2 | 3/2020 | Levert et al. | |
| 10,871,056 B2 | 12/2020 | Navar et al. | |
| 10,975,637 B2* | 4/2021 | Pilgrim | E21B 19/165 |
| 2002/0189806 A1* | 12/2002 | Davidson | E21B 41/0014 |
| | | | 166/336 |
| 2013/0275100 A1 | 10/2013 | Ellis et al. | |
| 2017/0002612 A1 | 1/2017 | Boone | |
| 2020/0224524 A1 | 7/2020 | Parmeshwar et al. | |
| 2021/0095540 A1* | 4/2021 | Murphy | E21B 23/00 |

FOREIGN PATENT DOCUMENTS

| | | |
|---|---|---|
| WO | 2019111066 A1 | 6/2019 |
| WO | 2020139944 A1 | 7/2020 |

\* cited by examiner

WELLHEAD ALIGNMENT SYSTEMS AND METHODS

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies search for and extract oil, natural gas, and other subterranean resources from the earth. Once a desired subterranean resource is discovered, drilling and production systems are employed to access and extract the desired subterranean resource. The drilling and production systems may be located onshore or offshore depending on the location of the desired subterranean resource. Damage to components of a drilling rig due to misalignment with a wellhead may cause equipment failure and/or may at least temporarily result in shut down of drilling operations.

BRIEF DESCRIPTION

In one embodiment, a wellhead alignment system includes a visual marker configured to be placed at a wellhead and a camera configured to capture an image that includes the visual marker. The wellhead alignment system also includes one or more processors configured to apply computer vision algorithms to identify the visual marker in the image and to calculate an offset between the wellhead and a drilling rig based on a position of the visual marker in the image.

In one embodiment, a drilling system includes a wellhead, a drilling rig, a visual marker coupled to the wellhead, and a camera coupled to the drilling rig and configured to capture an image that includes the visual marker. The drilling system also includes one or more processors configured to apply computer vision algorithms to identify the visual marker in the image and calculate an offset between the wellhead and the drilling rig based on a position of the visual marker in the image.

In one embodiment, a method of operating a wellhead alignment system includes receiving, at one or more processors, an image captured by a camera fastened to a drilling rig. The method also includes applying, using the one or more processors, computer vision algorithms to identify a position of a center of a visual marker coupled to a wellhead in the image. The method further includes calculating, using the one or more processors, an offset between the drilling rig and the wellhead based on the position of the center of the visual marker in the image.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
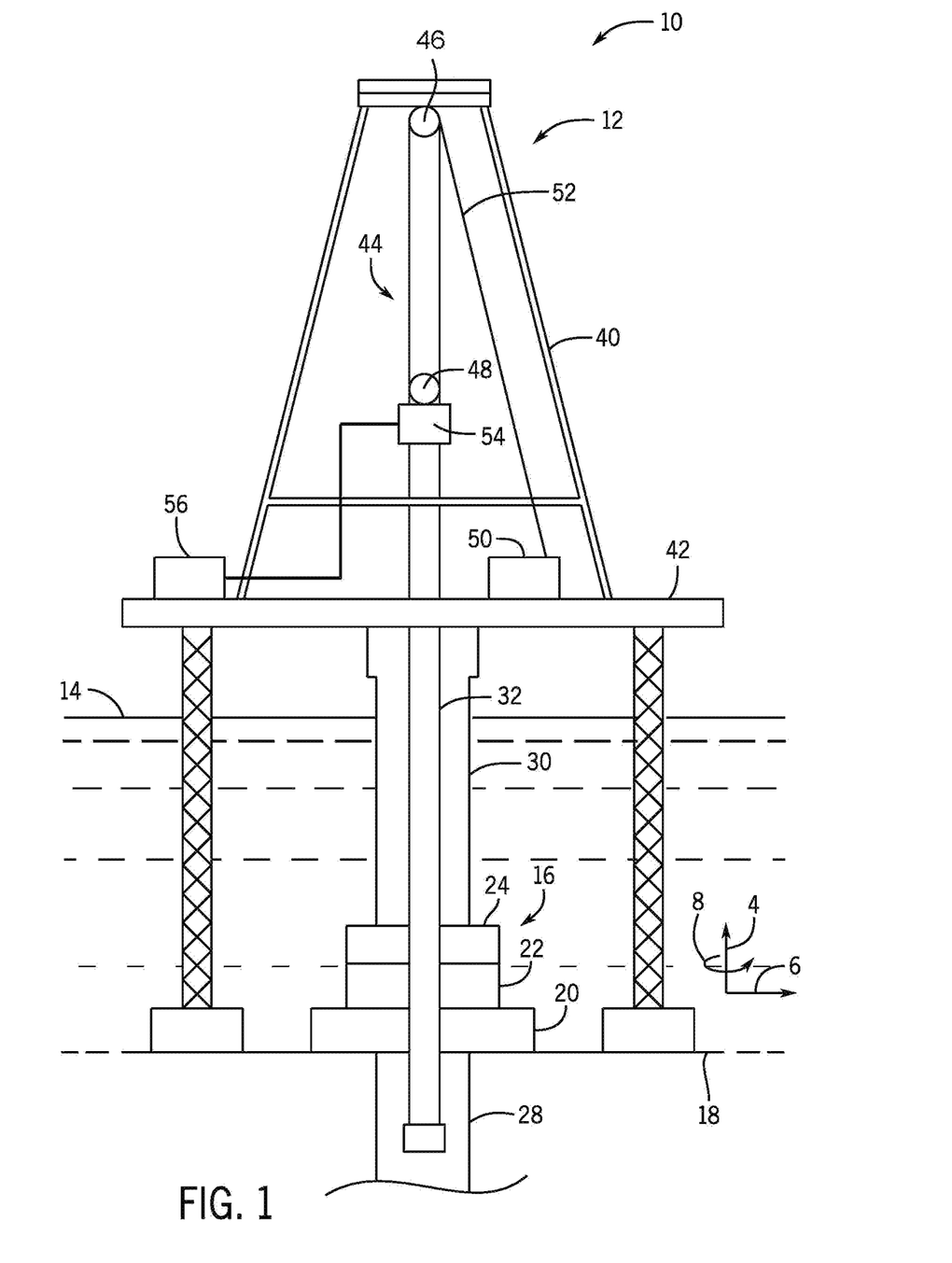
FIG. 1 is a side view of a drilling system, in accordance with an embodiment of the present disclosure.

FIG. 1 is a block diagram of an embodiment of a drilling system 10. To facilitate discussion, the drilling system 10 and its components may be described with reference to a vertical axis or direction 4, a radial axis or direction 6, and a circumferential axis or direction 8. The drilling system 10 may be configured to access various minerals and natural resources, including hydrocarbons (e.g., oil and/or natural gas), in the earth. Additionally or alternatively, the drilling system 10 may be configured to inject substances into the earth.

As shown, the drilling system 10 includes an offshore drilling rig or platform 12 (e.g., derrick) at or above a sea surface 14 and a wellhead assembly 16 positioned at a sea floor 18. The wellhead assembly 16 includes a wellhead 20, a blowout preventer (BOP) stack 22, a lower marine riser package (LMRP) 24, and/or additional components (e.g., connectors). The wellhead 20 may include a large diameter hub that is disposed at a termination of a wellbore 28, and the wellhead 20 provides for connection of the wellhead assembly 16 to the wellbore 28. The BOP stack 22 may include one or more ram BOPs, and the LMRP 24 may include one or more annular BOPs. The LMRP 24 may also include or be coupled to a connector (e.g., flex joint). The connector may be configured to receive and to couple (e.g., physically and fluidly couple) to a riser 30 (e.g., a drilling riser; tubular structure), which extends from the connector toward the platform 12.

Drilling operations may be carried out by a drill string 32 (e.g., tubular string) that extends from the platform 12, through the riser 30, through the wellhead assembly 16, and into a wellbore 28. The drill string 32 may include a drill bit that cuts through a subterranean formation to form or to drill the wellbore 28. A mast 40 is positioned on a drill floor 42 of the platform 12. The mast 40 and the drill floor 42 of the platform 12 support a hoisting system 44, which includes a crown block 46, a traveling block 48, and a drawworks system 50. A cable 52 (e.g., wire) extends from the drawworks system 50 and couples the crown block 46 to the traveling block 48. A top drive 54 is coupled to the traveling block 48. The top drive 54 rotates the drill string 32 as the hoisting system 44 raises and lowers the top drive 54 and the drill string 32 relative to the drill floor 42 to facilitate drilling of the wellbore 28. It should be appreciated that various other components (e.g., other devices that lift and/or provide torque to the drill string 32, such as a rotary table on the drill floor 42) and/or configurations may be utilized to drive movement of the drill string 32.

During the drilling operations, a pump 56 (e.g., piston pump) pumps a drilling fluid (e.g., drilling mud) into the wellbore 28. For example, the pump 56 may be used to pump the drilling fluid from a drilling fluid tank, through a port in the top drive 54, and into an interior channel in the drill string 32. The drilling fluid may exit the drill string 32 via ports in the drill bit, and then circulate upwardly through an annular space between an outer surface (e.g., annular surface) of the drill string 32 and an inner surface (e.g., annular surface) that defines the wellbore 28. The drilling fluid may then return to the drilling fluid tank (e.g., for analysis and/or recycling).

It is presently recognized that it is important to properly align the platform 12 (e.g., the top drive 54 and/or the rotary table supported by the platform 12) with the wellhead 20 during installation of the wellhead 20, during the drilling operations, and/or at other times. Misalignment between the platform 12 and the wellhead 20 may cause equipment failure and/or may at least temporarily result in shut down of the drilling operations. However, alignment between the platform 12 and the wellhead 20 may be difficult to achieve, particularly in certain environments (e.g., in offshore environments) that utilize a long vertical distance (e.g., greater than or equal to about 30, 40, 50, 60, 70, or 80 meters) between the platform 12 and the wellhead 20. Accordingly, as discussed in more detail herein, the drilling system 10 may include a wellhead alignment system to facilitate alignment between the platform 12 and the wellhead 20. For example, the wellhead alignment system may include a camera (e.g., imaging device) coupled to the platform 12 (e.g., coupled to the top drive 54 and/or centered over the rotary table on the drill floor 42) and oriented to capture an image of a visual marker coupled to the wellhead 20. The wellhead alignment system may also include a computing system (e.g., electronic computing system) that is configured to apply imaging processing techniques (e.g., computer vision techniques) to analyze the image to detect the alignment between the platform 12 and the wellhead 20, detect the misalignment between the platform 12 and the wellhead 20, determine an offset (e.g., radial offset; in an XY coordinate system) between the platform 12 and the wellhead 20, and/or determine an adjustment for the platform 12 that would provide the alignment between the platform 12 and the wellhead 20.

Figure 2:
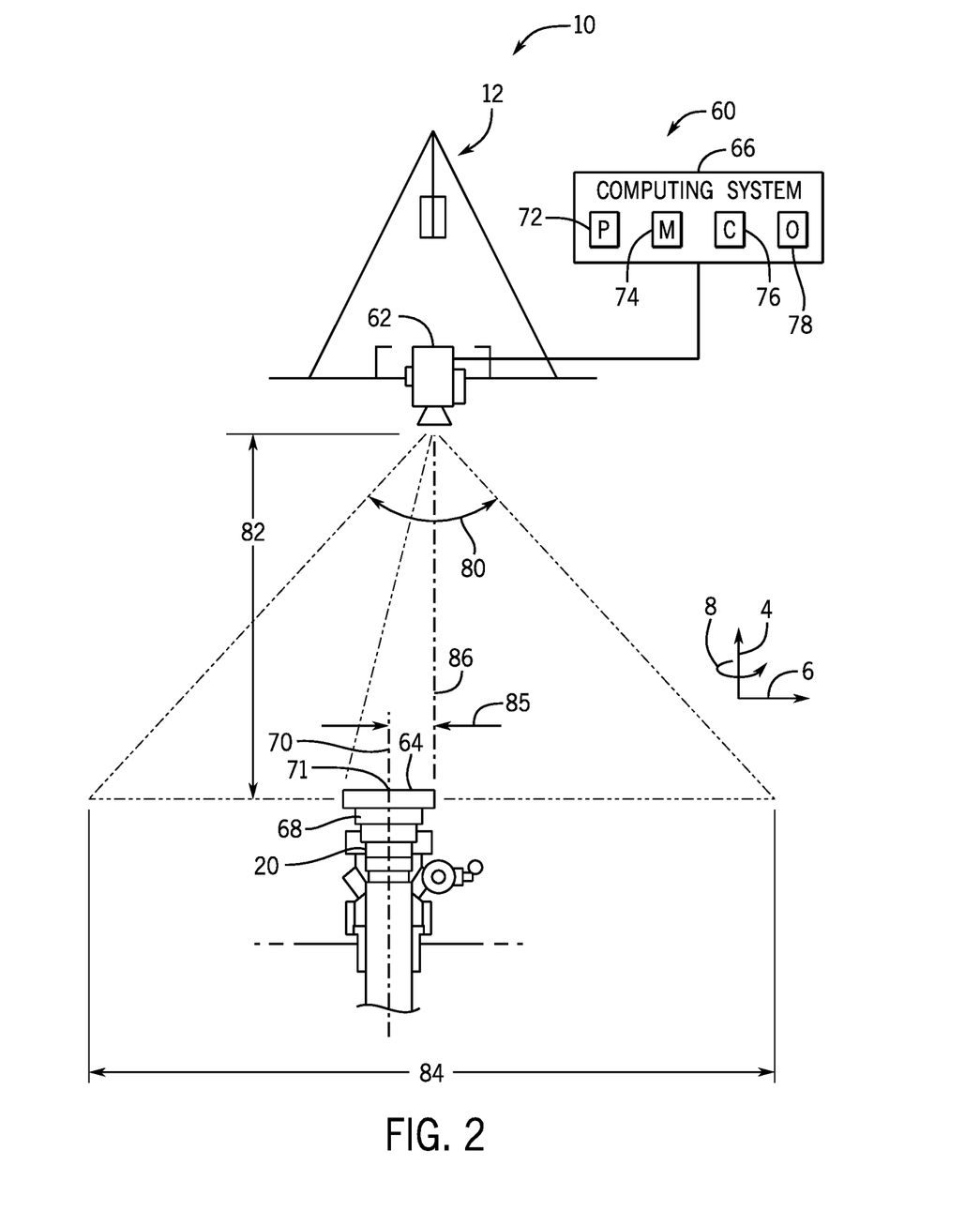
FIG. 2 is a side view of a wellhead alignment system that may be used in the drilling system of FIG. 1, in accordance with an embodiment of the present disclosure.

FIG. 2 is a side view of a wellhead alignment system 60 that may be used in the drilling system 10, in accordance with an embodiment of the present disclosure. As shown, the wellhead alignment system 60 may include a camera 62, a visual marker 64, and a computing system 66. The camera 62 may be coupled to the platform 12 (e.g., in a fixed, known position relative to the platform 12; via fastener(s), such as bolts; coupled to the top drive and/or centered over the rotary table on the drill floor) and oriented to capture an image of the visual marker 64 that is coupled to the wellhead 20 (e.g., in a fixed, known position relative to the wellhead 20; via fastener(s) and/or adhesive(s)). For example, the camera 62 may be oriented along the vertical axis 4, aligned with a gravity vector, and/or face downward toward the wellhead 20. An inclinometer may be coupled to the camera 62 to enable the camera 62 to be oriented in this way. Furthermore, in some embodiments, an additional inclinometer may be coupled to the wellhead 20 to enable the camera 62 to be aligned with the wellhead 20 (e.g., to one another and/or both to the gravity vector).

The visual marker 64 may include a colored and/or reflective marker (e.g., overlay; sheet; plate), a visual tag (e.g., visual fiducial tag, quick response [QR] code, bar code), and/or any other suitable visual marker 64 (e.g., visual target). For example, the visual marker 64 may include a colored plate that is placed at (e.g., fastened to) an end 68 of the wellhead 20 so as to form the visual marker 64. As another example, the visual marker 64 may include a plate with a colored portion in a defined shape (e.g., a circle of a particular diameter) that is placed at (e.g., fastened to) the end 68 of the wellhead 20 so as to form the visual marker 64. As another example, the visual marker 64 may include a plate with a reflective portion (e.g., retroreflective marker) that is placed at (e.g., fastened to) the end 68 of the wellhead 20 so as to form the visual marker 64, and the reflective portion is designed to reflect light toward the camera 62 (in some cases, the camera 62 may emit light that is then reflected by the reflective portion for detection by the camera 62). The visual marker 64 may be coupled to the wellhead 20 so that a central axis 70 of the wellhead 20 (e.g., of a central bore defined by the wellhead 20) extends through and/or aligns with a center 71 of the visual marker 64. However, it should be appreciated that the visual marker 64 may be coupled to the wellhead 20 in any suitable manner that provides known relative positions of the wellhead 20 and the visual marker 64.

The computing system 66 may include a processor 72, a memory device 74, a communication device 76, and/or an output device 78 (e.g., display and/or speaker). The computing system 66 is an electronic computing system having electrical circuitry configured to determine whether the platform 12 is aligned with the wellhead 20. The computing system 66 may be a distributed computing system including components located at the platform 12 and/or components remote from the platform 12. The processor 72 may include one or more processors, such as multiple microprocessors, one or more "general-purpose" microprocessors, one or more special-purpose microprocessors, and/or one or more application specific integrated circuits (ASICs), or some combination thereof.

The memory device 74 may include one or more memory devices, such as volatile memory (e.g., random access memory [RAM]), and/or nonvolatile memory (e.g., read-only memory [ROM]). The memory device 74 may store a variety of information and may be used for various purposes. For example, the memory device 74 may store processor-executable instructions (e.g., firmware or software) for the processor 72 to execute, such as instructions to carry out image analysis and computer vision techniques to determine whether the platform 12 is aligned with the wellhead 20, and so forth. The memory device 74 may include one or more storage devices, such as nonvolatile storage (e.g., ROM, flash memory, a hard drive, or any other suitable optical, magnetic, or solid-state storage medium, or a combination thereof). The one or more storage devices may store data, such as thresholds and/or look-up tables, for example. Additionally, the communication device 76 may facilitate wired and/or wireless communication of information (e.g., data, images) to other devices (e.g., remote computing systems; personal computing devices carried by operators of the drilling system 10). The output device 78 may include a display screen that provides visual outputs (e.g., the image captured by the camera 62, indicators of alignment/misalignment between the platform 12 and the wellhead 20) and/or a speaker that provides audible outputs (e.g., one type of alarm for acceptable alignment, another type of alarm for misalignment). It should be appreciated that the output device 78 may also operate as an input device (e.g., a touchscreen display). Furthermore, the computing system 66 may include fewer components, additional components, and/or alternative components.

In operation, once the visual marker 64 is coupled to the wellhead 20 and the platform 12 is positioned over the wellhead 20, the camera 62 may be operated to capture the image. The camera 62 may be tuned (e.g., automatically via the computing system 66 and/or manually via inputs from the operator) to have a field of view 80 (e.g., angle) that is appropriate for a vertical distance 82 between the camera 62 (e.g., an image sensor of the camera 62; known, calculated, and/or detected by a rangefinder) and the visual marker 64, as well as for a size/dimension of the visual marker 64 (e.g., a width or a diameter of the visual marker 64). For example, the camera 62 may be tuned to have the field of view 80 that creates an image width 84 such that a ratio between the size of the visual marker 64 and the image width 84 is between about 0.03 to 0.2 or 0.05 to 0.15. In some embodiments, the camera 62 may be tuned to have the field of view 80 that creates the image width 84 such that the ratio between the size of the visual marker 64 and the image width 84 is greater than or equal to about 0.1. The ratio affects the size of the visual marker 64 in the image captured by the camera 62 (e.g., a number or pixels occupied by the visual marker 64 in the image captured by the camera 62), which may affect image analysis of the image. For example, the image analysis techniques (e.g., computer vision techniques) may be challenging and/or less accurate if the ratio is smaller, but easier and/or more accurate if the ratio is larger. However, if the ratio is too large, the image captured by the camera 62 may not include the visual marker 64 at all (e.g., in the event that an offset between the platform 12 and the wellhead 20 is so large that the visual marker 64 is out of the narrow field of view of the camera 62). As shown, the camera 62 is tuned to have the field of view 80 that is centered about a field of view center axis 86. Furthermore, it should be appreciated that the image width 84 may be calculated based on the field of view 80 and the vertical distance 82, and an image height may be calculated based on the camera resolution and the image width 84.

In some embodiments, the wellhead alignment system 60 may carry out an iterative process in which the ratio is made progressively larger. In such cases, the computing system 66 may instruct the field of view 80 of the camera 62 to be a first, wider field of view to improve a likelihood of the visual marker 64 appearing in a first image captured by the camera 62. Then, the computing system 66 may carry out the image processing techniques to determine the offset between the platform 12 and the wellhead 20 based on the position of the visual marker 64 in the first image. In FIG. 2, the offset is represented as the offset 85 between the field of view center axis 86 and the center 71, which coincides with the central axis 70. Then, the computing system 66 may instruct or recommend movement of the platform 12 based on the offset and/or repeat these steps after setting the field of view 80 of the camera 62 to be a second, narrower field of view 80 that causes the visual marker 64 to appear larger in a second image captured by the camera 62. Then, the computing system 66 may carry out the image processing techniques to determine the offset between the platform 12 and the wellhead 20 based on the position of the visual marker 64 in the second image. The computing system 66 may continue to reset the field of view 80 of the camera 62 and refine the offset in this way until the offset is confirmed in multiple images and/or in at least one image that has a certain ratio (e.g., above a threshold ratio; the visual marker 64 is large enough in the image). As discussed in more detail herein, the iterative process may be carried out automatically by the computing system 66 (e.g., without inputs from the operator) and/or semi-automatically by the computing system 66 (e.g., with inputs from the operator; display the image with results of the image processing techniques and receive confirmation from the operator; receive instructions to set the field of view 80 of the camera 62 and/or to move the platform 12).

Figure 3:
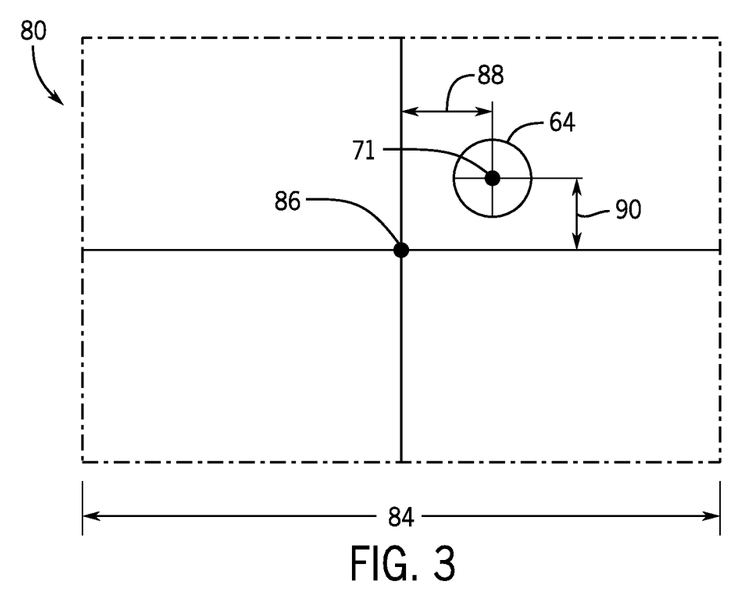
FIG. 3 is a schematic diagram of a field of view of a camera of the wellhead alignment system of FIG. 2 and a visual marker in the field of view of the camera, in accordance with an embodiment of the present disclosure.

FIG. 3 is a schematic diagram of the field of view 80 of the camera 62 of the wellhead alignment system 60 of FIG. 2 and the visual marker 64 in the field of view 80 of the camera 62, in accordance with an embodiment of the present disclosure. The schematic diagram also represents the image that may be captured by the camera 62 of the wellhead alignment system 60 of FIG. 2.

As shown, the field of view 80 provides the image width 84 and is centered about the field of view center axis 86. The field of view 80 enables the camera 62 of FIG. 2 to capture the image with the visual marker 64. In the illustrated embodiment, the visual marker 64 has a circular/round shape (e.g., a colored plate with a circular/round shape; a plate with a colored portion having a circular/round shape) and is positioned at a known location relative to the wellhead. In any case, the image may be provided to the computing system 66 of FIG. 2, which is configured to apply image processing techniques (e.g., computer vision techniques, such as based on a circle Hough Transform [CHT]) to determine the center 71 of the visual marker 64 in terms of pixel coordinates in the image (e.g., XY pixel coordinates relative to the field of view center axis 86). It should be appreciated that the image processing techniques may utilize additional inputs, such as the size/dimension of the visual marker 64.

Figure 4:
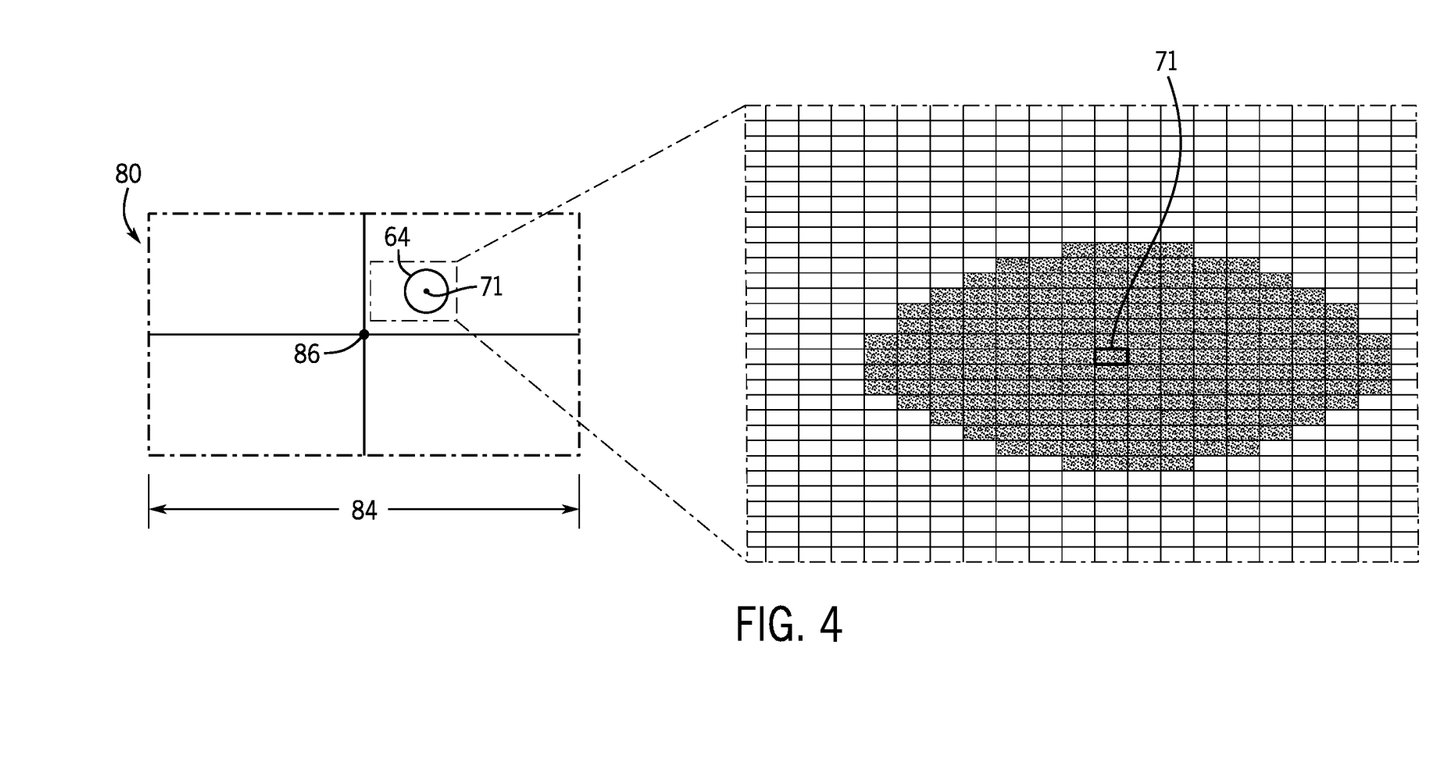
FIG. 4 is an example of pixel coordinates that may be used to facilitate detection of the visual marker in the field of view of the camera of the wellhead alignment system of FIG. 2, in accordance with an embodiment of the present disclosure.

FIG. 4 is an example of the pixel coordinates that may be used to facilitate detection of the visual marker 64 in the field of view 80 of the camera 62 of the wellhead alignment system 60 of FIG. 2, in accordance with an embodiment of the present disclosure. As shown, the visual marker 64 may have the circular/round shape (or any suitable shape). The computing system 66 of FIG. 2 may apply image processing techniques to identify the respective colors of the pixels of the image. Then, the computing system 66 may analyze the respective colors of the pixels of the image to filter/remove the pixels that do not correspond to the visual marker 64 and/or to isolate the pixels that correspond to the visual marker 64. Then, the computing system 66 may identify the center 71 of the visual marker 64. Then, the computing system 66 may determine the offset between the center 71 of the visual marker 64 and the field of view center axis 86. For example, the computing system 66 may determine the offset in terms of XY pixel coordinates relative to the field of view center axis 86, and then convert the offset into distance units (e.g., metric units, such as meters) based on the XY pixel coordinates, image resolution, the vertical distance between the camera 62 and the visual marker 64, the field of view 80 of the camera 62, and/or the size/dimension of the visual marker 64. In some embodiments, a grid pattern (e.g., ruler grid) may be positioned proximate to the visual marker 64 near the wellhead 20. The grid pattern may have known dimensions, such as each grid cell in the grid pattern is 10 centimeters by 10 centimeters. Then, the grid pattern may be present in the image and used to calculate the offset in the distance units (e.g., the center 71 and the field of view center axis 86 in the image are separated by 3 grid cells, and thus, the offset is 30 centimeters). With reference to FIG. 3, the computing system 66 may determine the offset as a first offset distance 88 (e.g., along the X axis) and a second offset distance 90 (e.g., along the Y axis). It should be appreciated that the computing system 66 may then calculate the offset between the platform 12 and the wellhead 20 based on the known position of the camera 62 relative to the platform 12 (e.g., the top drive; the center of the rotary table) and the known position of the visual marker 64 relative to the wellhead 20.

Figure 5:
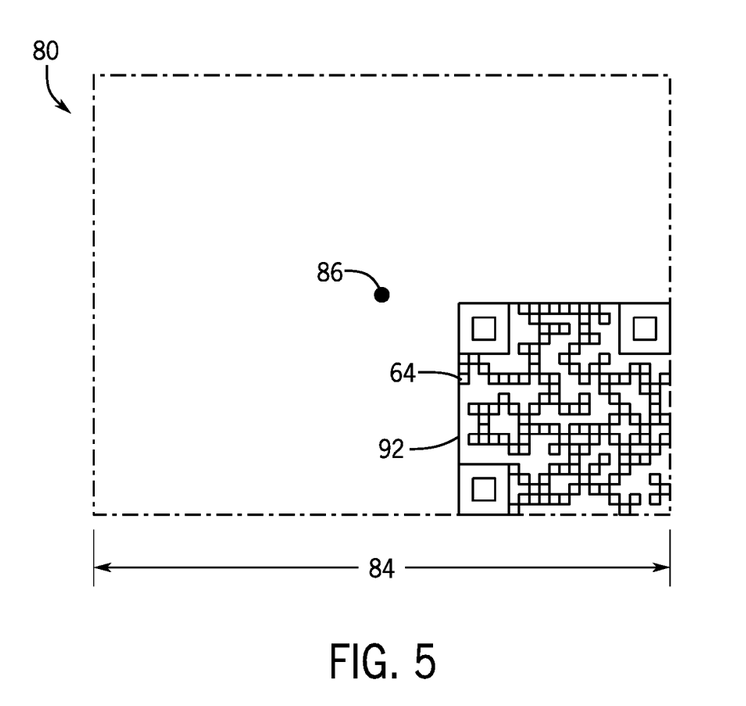
FIG. 5 is a schematic diagram of the field of view of the camera of the wellhead alignment system of FIG. 2 and a visual fiducial tag as the visual marker in the field of view of the camera, in accordance with an embodiment of the present disclosure.

FIG. 5 is a schematic diagram of the field of view 80 of the camera 62 of the wellhead alignment system 60 of FIG. 2 and a visual fiducial tag 92 as the visual marker 64 in the field of view 80 of the camera 62, in accordance with an embodiment of the present disclosure. It should be appreciated that the visual marker 64 may have any suitable form that enables the image processing techniques to accurately and precisely locate the position of the visual marker 64 in the image captured by the camera 62. Additionally, the visual fiducial tag 92 may be any suitable tag, including a bar code, a QR code, or the like. The visual fiducial tag 92 may be a two-dimensional tag. The computing system 66 of FIG. 2 may be configured to identify the visual fiducial tag 92 and to determine the location of the visual fiducial tag 92 (e.g., a portion, such as a center, a corner) relative to the field of view center axis 86, such as in terms of XY pixel coordinates. Then, the computing system 66 may convert the offset of the visual fiducial tag 92 into distance units (e.g., metric units, such as meters) based on the XY pixel coordinates, image resolution, the vertical distance between the camera 62 and the visual fiducial tag 92, the field of view 80 of the camera 62, and/or the size/dimension of the visual fiducial tag. It should be appreciated that the computing system 66 may then calculate the offset between the platform 12 and the wellhead 20 based on the known position of the camera 62 relative to the platform 12 (e.g., the top drive; the center of the rotary table) and the known position of the visual fiducial tag 92 relative to the wellhead 20.

Figure 6:
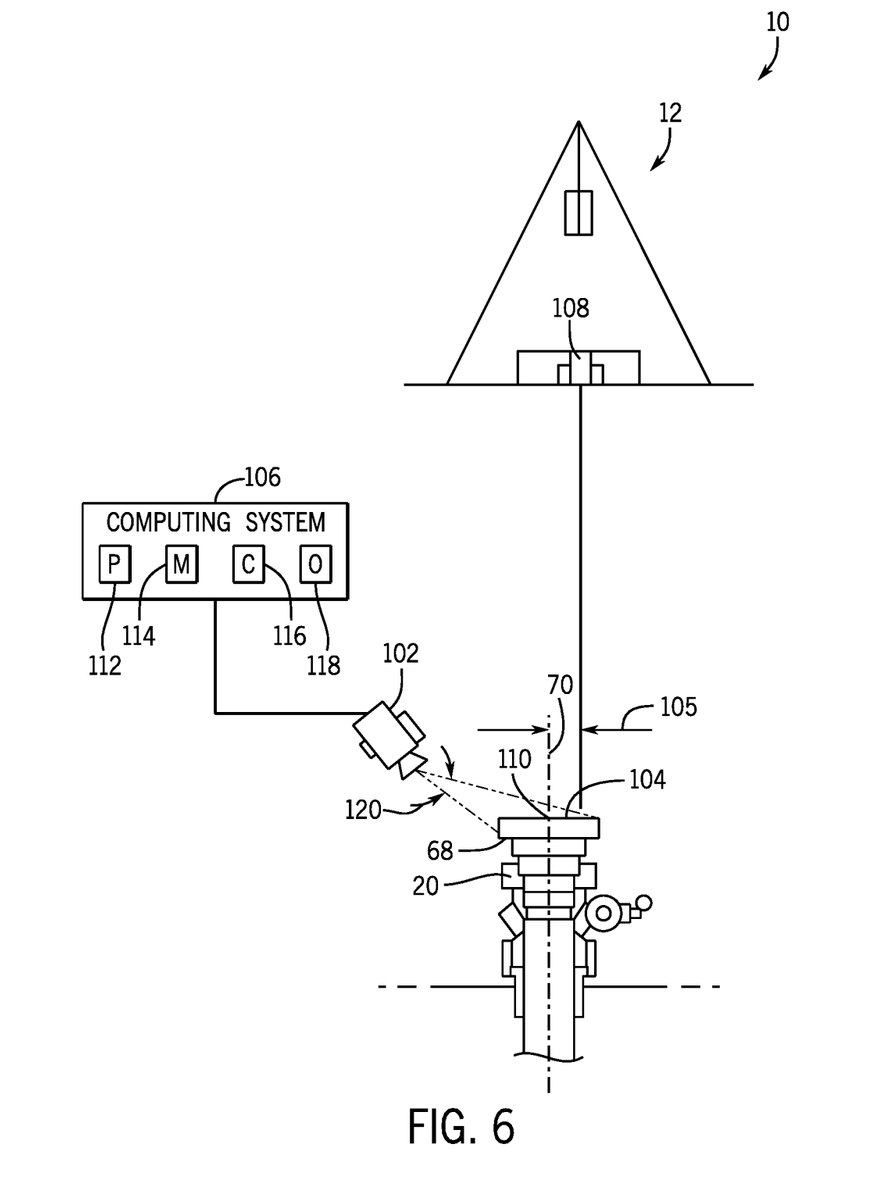
FIG. 6 is a side view of a wellhead alignment system that may be used in the drilling system of FIG. 1, wherein the wellhead alignment system includes a light emitter, in accordance with an embodiment of the present disclosure.

FIG. 6 is a side view of a wellhead alignment system 100 that may be used in the drilling system 10, in accordance with an embodiment of the present disclosure. As shown, the wellhead alignment system 100 may include a camera 102, a visual marker 104, a computing system 106, and a light emitter 108. The camera 102 may be positioned between the platform 12 and the wellhead 20 along the vertical axis 4 (e.g., in a fixed position; via fastener(s), such as bolts; coupled to the wellhead 20) and oriented to capture an image of the visual marker 104 that is coupled to the wellhead 20 (e.g., in a fixed position; via fastener(s) and/or adhesive(s)). Advantageously, the camera 102 and the visual marker 104 are located relatively close together (e.g., a respective distance between the camera 102 and the visual marker 104 is less than a respective distance between the platform 12 and the visual marker 104).

The visual marker 104 may include an overlay, sheet, or plate. For example, the visual marker 104 may include a colored sheet that is placed at (e.g., fastened to) the end 68 of the wellhead 20 so as to form the visual marker 104 with a respective shape that matches (e.g., corresponds to; is aligned/coaxial with) a respective shape of the end 68 of the wellhead 20. In some embodiments, the visual marker 104 may be coupled to the wellhead 20 so that the central axis 70 of the wellhead 20 extends through and/or aligns with a center 110 of the visual marker 104. However, it should be appreciated that the visual marker 104 may be coupled to the wellhead 20 in any suitable manner that provides known relative positions of the wellhead 20 and the visual marker 104.

The computing system 106 may include a processor 112, a memory device 114, a communication device 116, and/or an output device 118 (e.g., display and/or speaker). The computing system 106 may have any of the features of the computing system 66 described herein. Similarly, the processor 112 may have any of the features of the processor 72, the memory device 114 may have any of the features of the memory device 74, the communication device 116 may have any of the features of the communication device 76, and/or the output device 118 may have any of the features of the output device 78.

The light emitter 108 may be coupled to the platform 12 (e.g., coupled to the top drive and/or centered over the rotary table on the drill floor) and oriented to emit light toward the visual marker 104 coupled to the wellhead 20. The light emitter 108 may be oriented along the vertical axis 4, aligned with a gravity vector, and/or face downward toward the wellhead 20. An inclinometer may be coupled to the light emitter 108 to enable the light emitter 108 to be oriented in this way. Furthermore, in some embodiments, an additional inclinometer may be coupled to the wellhead 20 to enable the light emitter 108 to be aligned with the wellhead 20 (e.g., to one another and/or both to the gravity vector).

In operation, once the visual marker 64 is coupled to the wellhead 20 and the platform 12 is positioned over the wellhead 20, the light emitter 108 may be controlled to emit light (e.g., a light beam) toward the visual marker 104 and the camera 102 may be operated to capture the image of the visual marker 104. The camera 102 may be tuned to have a field of view 120 (e.g., angle) that covers the visual marker 104 (e.g., includes an entirety of the visual marker 104 in the field of view 120). The light from the light emitter 108 hits or impinges upon the visual marker 104, thus forming a point of light on the visual marker 104. The point of light may be considered part of the visual marker 104 as it is used to align the platform 12 and the wellhead 20. As discussed herein, the computing system 106 may carry out the image processing techniques to determine the offset between the platform 12 and the wellhead 20 based on the position of the point of light relative to the visual marker 104, as captured in the image. In FIG. 6, the offset is represented as the offset 105 between the light from the light emitter 108 (e.g., the point of light) and the center 110, which coincides with the central axis 70.

Figure 7:
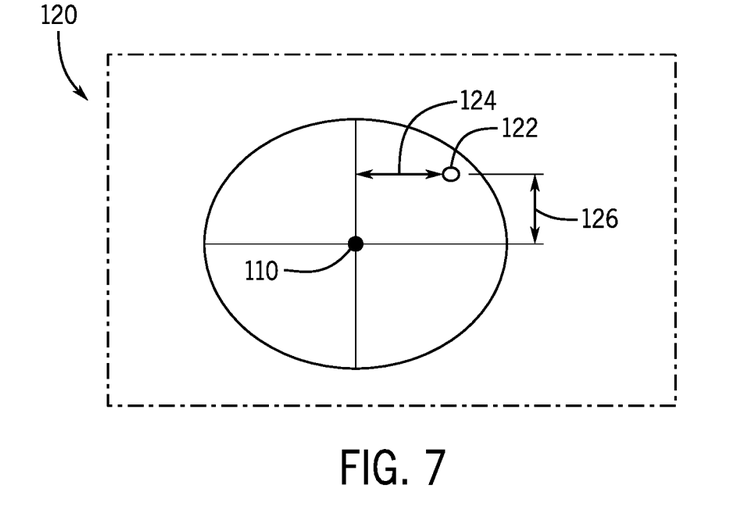
FIG. 7 is a schematic diagram of a field of view of a camera of the wellhead alignment system of FIG. 6 and a visual marker in the field of view of the camera, in accordance with an embodiment of the present disclosure.

FIG. 7 is a schematic diagram of the field of view 120 of the camera 102 of the wellhead alignment system 100 of FIG. 6 and the visual marker 104 in the field of view 120 of the camera 102, in accordance with an embodiment of the present disclosure. The schematic diagram also represents the image that may be captured by the camera 102 of the wellhead alignment system 100 of FIG. 6.

As shown, the field of view 120 includes the visual marker 104, which has a circular/round shape that may be created due to wrapping the visual marker 104 over the end of the wellhead 20 and/or due to placement of a circular/round visual marker 104 over the end of the wellhead 20. In any case, the field of view 120 enables the camera 102 of FIG. 6 to capture the image with the visual marker 104. Furthermore, the image with the visual marker 104 indicates a location of the center 110 of the visual marker 104 in the image. The location of the center 110 of the visual marker 104 may be aligned with the central axis 70 of the wellhead 20 or otherwise be at a known position relative to the wellhead 20.

As shown, the light from the light emitter 108 hits and/or impinges on the visual marker 104, and thus, the image also includes a point of light 122 on the visual marker 104 (e.g., region or area of impingement of the light from the light emitter 108). The point of light 122 may be considered part of the visual marker 104 as it is used to align the platform 12 and the wellhead 20. More particularly, the image may be provided to the computing system 106 of FIG. 6, which is configured to apply image processing techniques (e.g., computer vision techniques) to determine the offset between the center 110 of the visual marker 104 and the point of light 122 on the visual marker 104 (e.g., in terms of pixel coordinates in the image; XY pixel coordinates relative to the center 110 of the visual marker 104). For example, the computing system 106 may determine the offset as a first offset distance 124 (e.g., along the X axis) and a second offset distance 126 (e.g., along the Y axis).

Then, the computing system 66 may convert the offset into distance units (e.g., metric units, such as meters) based on the XY pixel coordinates, image resolution, a distance between the camera 102 and the visual marker 104, the field of view 120 of the camera 102, and/or the size/dimension of the visual marker 104. It should be appreciated that the computing system 66 may then calculate the offset between the platform 12 and the wellhead 20 based on the known position of the light emitter 108 relative to the platform 12 (e.g., the top drive; the center of the rotary table) and the known position of the visual marker 104 relative to the wellhead 20.

It should be appreciated that the wellhead alignment systems 60, 100 disclosed herein may be configured to use the offset to make various determinations and/or to provide various outputs. For example, the offset may indicate whether the platform 12 is properly aligned with the wellhead 20 (e.g., within a tolerance range, which may vary based on the vertical distance between the platform 12 and the wellhead 20). In response to determining that the platform 12 is properly aligned with the wellhead 20, the computing systems 66, 106 of the wellhead alignment systems 60, 100 may provide a displayed message and/or an audible alarm via the output devices 78, 118 to notify an operator that the platform 12 is properly aligned with the wellhead 20. Additionally or alternatively, the computing systems 66, 106 of the wellhead alignment systems 60, 100 may provide an electronic control signal to initiate the drilling operations (e.g., to automatically control the hoisting system and/or other equipment to initiate and/or to prepare for the drilling operations).

In response to determining that the platform 12 is not properly aligned with the wellhead 20, the computing systems 66, 106 of the wellhead alignment systems 60, 100 may provide a displayed message and/or an audible alarm via the output devices 78, 118 to notify the operator that the platform 12 is not properly aligned with the wellhead 20. For example, in such cases, the displayed message may include a recommendation to move the platform 12. Additionally or alternatively, the computing systems 66, 106 of the wellhead alignment systems 60, 100 may provide an electronic control signal to move the platform 12 (e.g., to automatically control actuators and/or other equipment to move or to enable/assist with movement of the platform 12). In some embodiments, the computing systems 66, 106 of the wellhead alignment systems 60, 100 may provide an indication (e.g., in the displayed message) of the offset between the platform 12 and the wellhead 20. For example, the indication may include the distance units between the platform 12 and the wellhead 20 (e.g., 2 meters; 2 meters to the left along the x-axis and 3 meters up along the y-axis). The indication may include the image captured by the camera 62, 102, and the image may be overlaid and/or edited to include labels/markers to facilitate understanding by the operator (e.g., labels for the field of view center axis; the center of the visual marker; the offset, such as the first offset distance and the second offset distance). The computing systems 66, 106 of the wellhead alignment systems 60, 100 may carry out the steps to detect the alignment between the platform 12 and the wellhead 20 in response to an input command from the operator.

Additionally, it should be appreciated that more than one visual marker 64, 104 may be utilized to carry out the alignment between the platform 12 and the wellhead 20. For example, the visual markers 64 may include multiple colored portions (e.g., multiple circles; the same or different from one another, such as with respect to color, size, and/or shape) on a plate and/or multiple visual fiducial tags 92 (e.g., the same or different from one another). In such cases, the computing systems 66, 106 may use the multiple visual markers 64, 104 to determine the alignment (e.g., determine respective offsets based on the multiple visual markers 64, 104, and then fusing the respective offsets by taking an average or a median). The computing systems 66, 106 may also use the multiple visual markers 64, 104 for calibration purposes, such as by determining relative positions (e.g., in pixels) and distance (e.g., in meters) between the multiple visual markers 64, 104 (e.g., based on a known, measured distance between the visual markers 64, 104). The multiple visual markers 64, 104 may make the wellhead alignment systems 60, 100 more robust (e.g., if the camera 62, 102 does not capture one of the visual markers 64, 104, it may still detect others).

Figure 8:
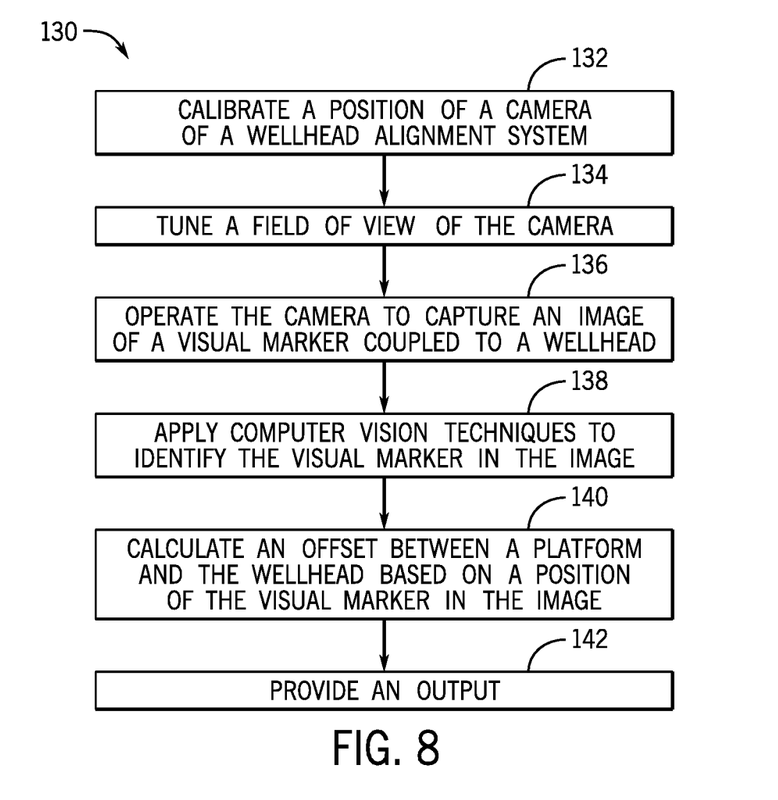
FIG. 8 is a flow diagram of a method of operating a wellhead alignment system, in accordance with an embodiment of the present disclosure.

FIG. 8 is a flow diagram of a method 130 of operating a wellhead alignment system, such as the wellhead alignment systems 60, 100, in accordance with an embodiment of the present disclosure. The following description of the method 130 is described as being performed by a computing system, but it should be noted that any suitable processor-based device or system may be specially programmed to perform any of the methods described herein. Moreover, although the following description of the method 130 is described as including certain steps performed in a particular order, it should be understood that the steps of the method 130 may be performed in any suitable order, that certain steps may be omitted, and/or that certain steps may be added.

In block 132, the method 130 may be begin with calibrating a position of a camera of a wellhead alignment system. The calibration may establish a relationship between XY axes in a camera frame and a global coordinate system (e.g., North and East axes) on the platform. In block 134, the method 130 may continue with tuning a field of view of the camera of the wellhead alignment system until a visual marker is visible in the field of view of the camera (e.g., an image captured by the camera contains the visual marker). In block 136, the method 130 may continue with operating the camera to capture the image that contains the visual marker. In block 138, the method 130 may continue with performing computer vision techniques to assess the image and to identify the visual marker in the image.

In block 140, the method 130 may continue with calculating an offset between the platform (e.g., a top drive or a center of a rotary table) and the wellhead (e.g., a center axis of the wellhead). In some embodiments, the offset may be based on XY coordinates between a center of the visual marker, which may coincide with the center axis of the wellhead, and a field of view center axis of the camera. In some embodiments, the offset may be based on XY coordinates between the center of the visual marker, which may coincide with the center axis of the wellhead, and a point of light emitted by a light emitter onto the visual marker. In block 142, the method 130 may continue with providing an output based on the offset between the platform and the wellhead. For example, the output may include a confirmation of the alignment between the platform and the wellhead, a recommendation to move the platform, the offset, the image, and/or any other information. The calibration performed in block 132 may facilitate proper movement of the platform to address (e.g., improve, remove, correct) the offset.

Figure 9:
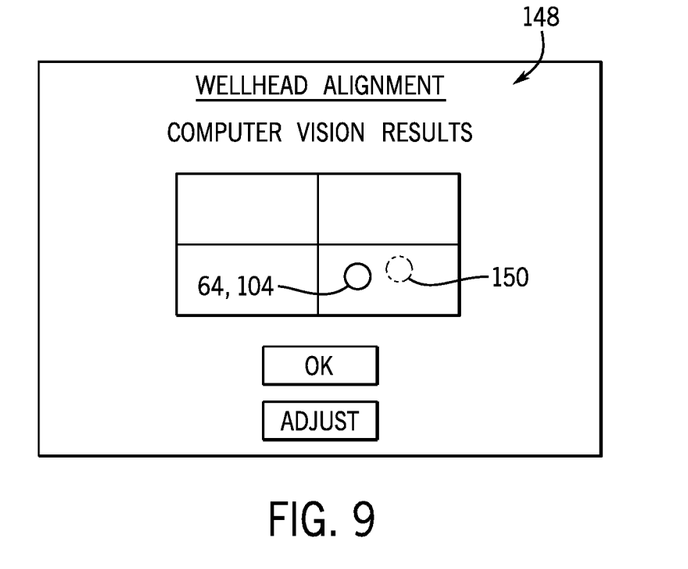
FIG. 9 is an example of a graphical user interface (GUI) that may be presented on a display screen by a wellhead alignment system, in accordance with an embodiment of the present disclosure.

It should be appreciated that the method 130 may be a fully automated process (e.g., without operator inputs) and/or a semi-automated process (e.g., with operator inputs). For example, in the semi-automated process, the operator may turn on the camera and observe the image captured by the camera on the display screen of the computing system, and then the operator may provide inputs to tune the field of view of the camera until the operator is able to visualize the visual marker in the image captured by the camera and shown on the display screen of the computing system. The computing system may perform the computer vision techniques to assess the image and to identify the visual marker in the image, and the computing system may overlay the results onto the image captured by the camera and shown on the display screen of the computing system. In this way, the operator may confirm and/or approve the computer vision techniques (e.g., confirm that the results match the visual marker that is visible in the image). The operator may also provide inputs to repeat previous steps (e.g., to capture a new image and perform the computer vision techniques on the new image) and/or to refine the results (e.g., shift the results to match the visual marker that is visible in the image). For example, FIG. 9 is an example of a graphical user interface (GUI) 148 that may be presented on a display screen for visualization by an operator. The GUI 148 includes a representation of the image that shows the visual marker 64, 104 and a result indicator 150 (e.g., symbol) of the computer vision techniques (e.g., a location of the visual marker 64, 104 in the image, as determined by the computing system). If the visual marker 64, 104 and the result indicator 150 are aligned in the image, then the operator may select "ok" to confirm. However, if the visual marker 64, 104 and the result indicator 150 are not aligned in the image, then the operator may select "adjust" and then drag the result indicator 150 to align with the visual marker 64, 104 in the image. The GUI 148 may present other selectable options, such as to tune the field of view of the camera, repeat the alignment process, move the platform, view a numerical representation of the offset (e.g., in meters), or the like. The GUI 148 may enable the operator guide an iterative process, as described herein.

The computing system may perform calculations to determine the offset in terms of the XY pixel coordinates and/or the distance units, as well as to provide various outputs as described herein. The outputs may include displayed messages, audible alarms, and/or control signals. It should be appreciated that the method 130 (or certain steps of the method 130) may be carried out multiple times over a time period to provide multiple data points (e.g., the offset at different times) to account for and/or to provide improved accuracy of the alignment process in the presence of wave motions, lighting conditions, fluid/water conditions in the offshore environment, and the like. For example, the offset may be calculated as the average or the median of the multiple data points, the offset may only be considered reliable if variations in the offset over time are below a threshold, if the ratio between the size/dimension of the visual marker and the image width exceeds a threshold ratio, or the like.

It should be appreciated that the visual marker may be the wellhead itself (e.g., without the overlay, the screen, the plate, or the visual tag). However, in certain situations, the use of the overlay, the screen, the plate, the visual tag, and/or the light may provide advantages over using the computer vision techniques to identify the wellhead itself. For example, there are multiple different types of wellheads (e.g., sizes, colors, textures, shapes), and the computer vision techniques would be trained to detect all of the different types of wellheads. However, there may be limited versions (or only one version) of the overlay, the screen, the plate, and/or the visual tag even for use with different types of wellheads, which may simplify and/or enable use of the computer vision techniques without training to detect all of the different types of wellheads. Furthermore, the wellhead itself includes a metal surface that may reflect light in unexpected and/or unpredictable ways, particularly under variable light and/or weather conditions in the offshore environment. The overlay, the screen, the plate, and/or the visual tag may provide a more predictable and/or stable target for the computer vision techniques, particularly under the variable light and/or weather conditions in the offshore environment. The wellhead alignment system includes various physical components/structures, such as the visual marker(s), the camera, the computing system, and/or the light emitter. These components are arranged in a particular manner and are controlled in a coordinated manner to efficiently carry out the techniques disclosed herein (e.g., to enable the computing system to efficiently apply the computer vision algorithms to enable alignment of the platform to the wellhead).

While only certain features have been illustrated and described herein, many modifications and changes will occur to those skilled in the art. It is, therefore, to be understood that the appended claims are intended to cover all such modifications and changes as fall within the true spirit of the disclosure. It should be appreciated that any features shown and described with reference to FIGS. 1-9 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A wellhead alignment system, comprising:
   a visual marker configured to be placed at a wellhead positioned at a sea floor;
   a camera configured to capture an image that includes the visual marker, the camera fastened to a top drive of an offshore drilling rig or centered above a rotary table of the offshore drilling rig, the offshore drilling rig at least partially positioned at or above a sea surface; and
   one or more processors configured to apply computer vision algorithms to identify the visual marker in the image and to calculate an offset between the wellhead and the offshore drilling rig based on a position of the visual marker in the image.

2. The wellhead alignment system of claim 1, wherein the visual marker comprises a plate fastened to an end of the wellhead.

3. The wellhead alignment system of claim 1, wherein the visual marker comprises a colored plate, a colored circle on a plate, a retroreflective marker, a visual fiducial tag, or any combination thereof.

4. The wellhead alignment system of claim 1, comprising a light emitter, wherein the visual marker comprises a light emitted by the light emitter.

5. The wellhead alignment system of claim 1, wherein the one or more processors are configured to:
   identify a center of the visual marker in the image;
   determine the position of the center of the visual marker in the image in terms of pixel coordinates relative to a field of view central axis of the camera; and
   calculate the offset between the wellhead and the offshore drilling rig based on the position of the center of the visual marker in the image.

6. The wellhead alignment system of claim 1, wherein the one or more processors are configured to:
   generate a graphical user interface with the image having an indicator overlaid onto the image, wherein the indicator represents a result of the computer vision algorithms to identify the visual marker in the image; and
   output the graphical user interface on a display screen for visualization by an operator.

7. The wellhead alignment system of claim 1, wherein the one or more processors are configured to provide an output in response to the offset between the wellhead and the offshore drilling rig exceeding a tolerance.

8. The wellhead alignment system of claim 7, wherein the output comprises a graphical user interface with an indication of the offset on a display screen for visualization by an operator.

9. The wellhead alignment system of claim 1, comprising an additional visual marker configured to be placed at the wellhead, wherein the camera is configured to capture the image that includes the additional visual marker, and the one or more processors are configured to apply the computer vision algorithms to identify the additional visual marker in the image and to calculate the offset between the wellhead and the offshore drilling rig based on the position of the visual marker in the image and a respective position of the additional visual marker in the image.

10. A drilling system, comprising:
    a wellhead positioned at a sea floor;
    a drilling rig at least partially positioned at or above a sea surface;
    a visual marker coupled to the wellhead;
    a camera fastened to a top drive of the drilling rig or centered above a rotary table of the drilling rig, the camera configured to capture an image that includes the visual marker; and
    one or more processors configured to apply computer vision algorithms to identify the visual marker in the image and calculate an offset between the wellhead and the drilling rig based on a position of the visual marker in the image.

11. The drilling system of claim 10, wherein the visual marker comprises a plate fastened to an end of the wellhead.

12. The drilling system of claim 10, wherein the visual marker comprises a colored plate, a colored circle on a plate, a retroreflective marker, or a visual fiducial tag, or any combination thereof.

13. The drilling system of claim 10, wherein the one or more processors are configured to:
    identify a center of the visual marker in the image;
    determine a position of the center of the visual marker in the image in terms of pixel coordinates relative to a field of view central axis of the camera; and
    calculate the offset between the wellhead and the drilling rig based on the position of the center of the visual marker in the image.

14. A method of operating a wellhead alignment system, the method comprising:
    receiving, at one or more processors, a first image captured by a camera fastened to a drilling rig, wherein the camera captures the first image a first field of view;
    applying, using the one or more processors, computer vision algorithms to identify a position of a center of a visual marker coupled to a wellhead in the first image;
    calculating, using the one or more processors, a first offset between the drilling rig and the wellhead based on the position of the center of the visual marker in the first image;
    moving the drilling rig based on the first offset;
    receiving, at the one or more processors, a second image captured by the camera at a second field of view that is narrower than the first field of view;
    applying, using the one or more processors, computer vision algorithms to identify a position of a center of the visual marker in the second image; and calculating, using the one or more processors, a second offset between the drilling rig and the wellhead based on the position of the center of the visual marker in the second image.

15. The method of claim 14, comprising providing, using the one or more processors, an output in response to the first offset between the wellhead and the drilling rig exceeding a tolerance.

16. The method of claim 15, wherein the output comprises a graphical user interface with an indication of the first offset on a display screen for visualization by an operator.

17. The method of claim 14, moving the drilling rig based on the second offset.

* * * * *